March 24, 1953 W. VAN GUILDER 2,632,635
PORTABLE BEATER ATTACHMENT FOR HOUSEHOLD FOOD MIXERS
Filed March 6, 1950 2 SHEETS—SHEET 1
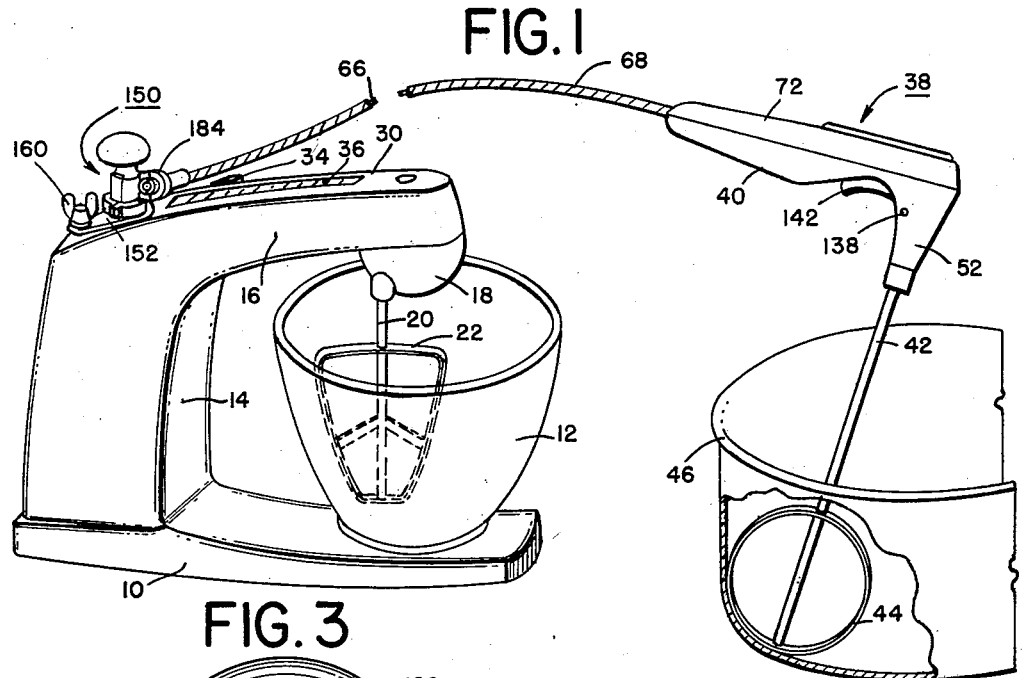
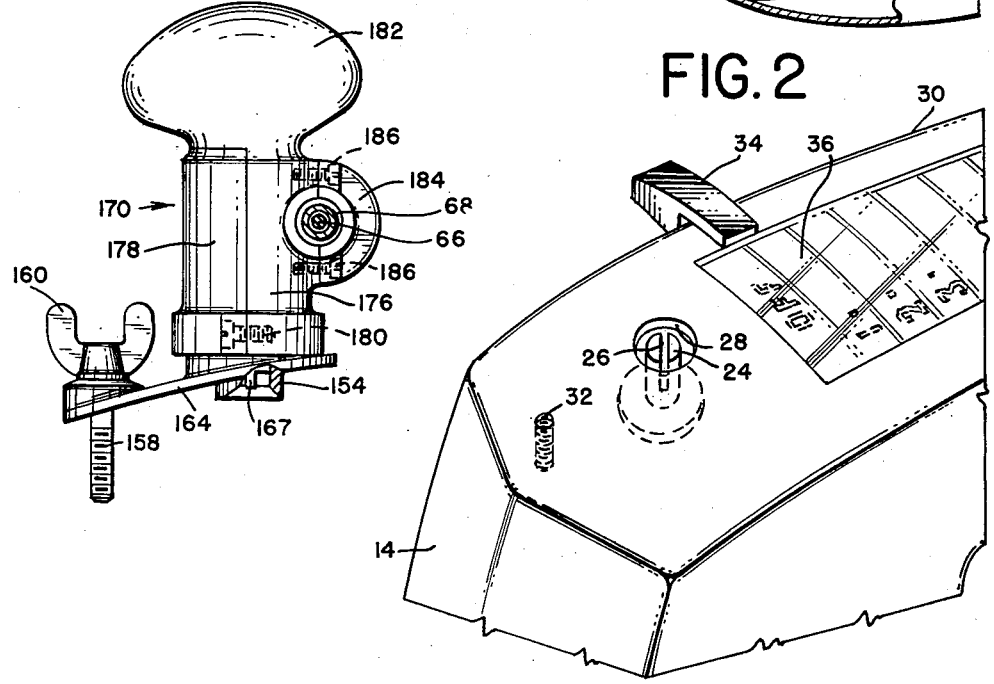
INVENTOR:-
WALTER VAN GUILDER
BY William C. Babcock ATTORNEY

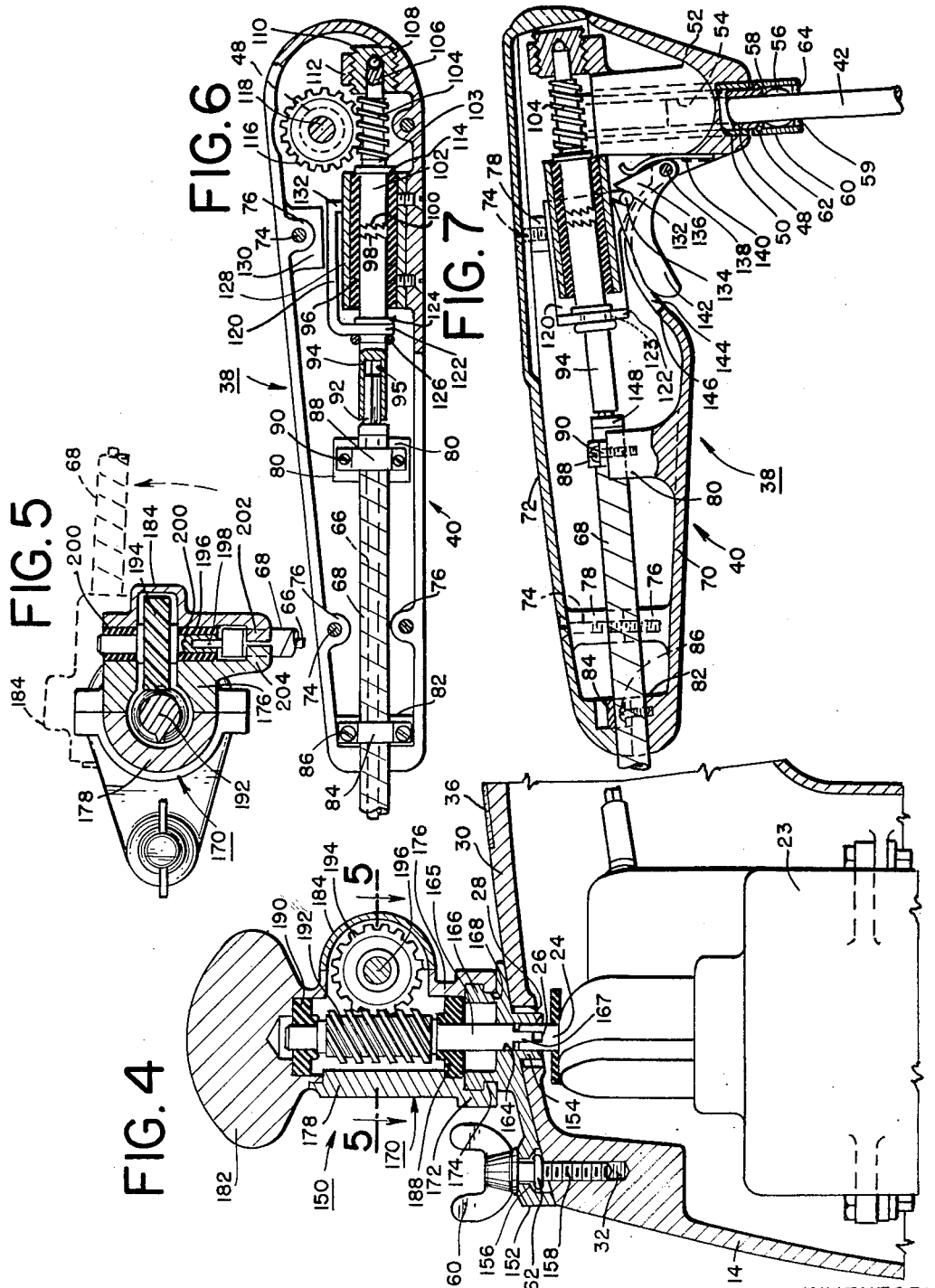

Patented Mar. 24, 1953

2,632,635

UNITED STATES PATENT OFFICE 2,632,635

PORTABLE BEATER ATTACHMENT FOR HOUSEHOLD FOOD MIXERS

Walter Van Guilder, River Forest, Ill., assignor to General Mills, Inc., a corporation of Delaware Application March 6, 1950, Serial No. 147,898

9 Claims. (Cl. 259—102)

The present invention pertains to household food mixers and more particularly to a portable beater attachment for use with such a mixer.

Various constructions have been proposed in the prior art to provide a household food mixer which could be used as a portable beater when the operator desired to stir items on the stove or at some other location remote from the normal position of the mixer. Most of these proposals have involved a construction in which the motor and gear casing of a standard household food mixer could be removed from the base on which the casing is normally supported in operative relation with a mixing bowl, and could be carried manually by the operator to the other desired location. In these cases the operator has to carry the weight of the motor and gear casing. If the power unit of such a mixer is powerful enough for the uses ordinarily required of a household mixer, the weight of these items will be so great that it is extremely difficult and inconvenient for the operator to hold the unit at the stove and operate it for any substantial length of time without fatigue.

Some attempts have been made to avoid this problem by provision of an entirely separate mixing unit which incorporates a relatively light motor and gear casing and which is suitable for use as a portable egg beater. Such a unit, however, does not provide sufficient power for the heavier tasks performed by a stationary household food mixer. And since the motor is a major item of expense, it is uneconomical to provide a stationary mixer with one motor and a portable unit with a separate motor.

Furthermore, in certain types of household food mixers, it is considered highly desirable to utilize a planetary beater shaft for adequate mixing. With such a planetary beater it is essential that the motor and gear casing, on the one hand, and the mixing bowl, on the other, be rigidly supported with respect to each other. Thus it is entirely impractical to make the motor, gear casing, and planetary beater head of such a unit relatively removable from its base for portable operation at a stove or other location, since the user could not hold the power unit and container with sufficient rigidity to permit the planetary action of the beater in a container loosely positioned on such a stove. Therefore no practical method has been provided to permit the owner of a powerful planetary type of mixer to achieve the advantages of portable operation at some other location.

With these problems of the prior art in view, it is accordingly one object of the present invention to provide a portable beater attachment for a household food mixer or power unit.

Another object is the provision of a portable beater attachment in which the beater unit carried by the operator is relatively light and easy to handle.

Still another object is a portable beater attachment in which a beater unit is connected by a flexible power shaft to a suitable power take-off on a household food mixer or power unit of any desired type.

A further object is the provision of a portable attachment which is connected by a flexible power shaft to a standard household power unit and in which the portable unit has manually operable means controlling the operation of its beater.

Another object is the provision of a portable attachment in which a small beater unit is connected by a flexible shaft to a household power unit of standard type, and in which the means for attachment of the shaft to the power unit permits relative swinging movement of the shaft and the portable unit in different directions.

Other objects and advantages of the invention will be apparent from the following specification in which a preferred embodiment of the device has been described.

In the drawings forming a part of this application,

Figure 1 is a perspective view showing a portable attachment according to the present invention assembled in combination with a household food mixer.

Fig. 2 is a partial perspective view of the casing of the food mixer of Fig. 1 showing details of the power take-off shaft and other mechanism.

Fig. 3 is a side view of the means for removable attachment of one end of the flexible power shaft of the device of Fig. 1 to the food mixer casing.

Fig. 4 is a partial sectional view, with certain portions broken away for clearness, taken in the plane of the power take-off shaft of the food mixer, with the device of Fig. 3 attached in operative position.

Fig. 5 is a sectional view on the line 5—5 of Fig. 4.

Fig. 6 is a top view of the portable beater unit of Fig. 1, with the top casing section of the beater unit removed and certain portions broken away and shown in section for clearness, and Fig. 7 is a side view of the beater unit of Figs. 1 and 6, with certain portions shown in section and other portions broken away for clearness.

As shown in Fig. 1, the portable beater attachment according to the present invention is designed for use with a household power unit or food mixer which includes a base 10. A mixing bowl 12 is supported at one end of the base 10, while a pedestal or casing 14 at the other end of the base provides the necessary support and enclosing housing for the power unit. This pedestal or casing portion 14 has an extension 16 which projects laterally over the base and above the mixing bowl 12.

In the type of mixer illustrated, this projecting casing portion 16 carries at its outer end a planetary beater head 18 provided with an offset or planetary beater drive shaft 20. A beater 22 is attached to and driven by the planetary beater drive shaft 20 so that the beater 22 rotates on its own axis and also revolves around the mixing bowl 12 on the axis of the planetary head 18.

As shown in Fig. 4, the casing or pedestal portion 14 encloses a power unit which is illustrated as an electric motor 23. The motor is mounted and oriented with the axis or shaft of the motor extending vertically within the casing 14.

A power take-off shaft 24 is rotatably mounted within the casing and may be connected to the motor in any desired fashion. In this particular case the motor shaft itself serves as the power take-off shaft 24 and is provided at its upper end with a cross slot or notch 26 for driving engagement with any desired attachment. An opening 28 in the top wall 30 of the casing 14 provides access to the end of the motor shaft or power take-off shaft 24 for connection of such attachments.

The mixer casing 14 is also provided with an internally threaded opening 32 which is spaced laterally from the opening 30 and which serves as a means for attachment of the desired accessories. As shown in Fig. 2, the mixer or power unit also includes a manually operable speed control member 34 which cooperates with a suitable scale 36 to indicate the particular operating characteristics of the device. Thus member 34 may be used to control the speed at which power take-off shaft 24 rotates.

As shown in Figs. 1, 6, and 7, the portable beater attachment according to the present invention includes a beater unit designated generally at 38. This beater unit has a handle portion 40 which is shaped so that it may be readily grasped by one hand of the operator. At one end of the unit 38 a rotary beater 42 is supported, this beater having blades 44 of any desired configuration. A single beater 42 has been shown for convenience in illustration, although it will be apparent from the following description that a pair of beaters of the standard intermeshing egg-beater type may be provided if desired. Beater 42 and its blades 44 are designed for cooperation with any standard cooking or mixing receptacle such as the one shown at 46.

The beater unit 38 includes a beater drive shaft 48 (Fig. 7) which is mounted in a vertically disposed bearing sleeve 50 at one end of the unit. Bearing sleeve 50, in turn, is located within the vertically depending portion 52 of the beater unit casing.

Beater drive shaft 48 has a longitudinal axial recess 54 in which the end of beater shaft 42 may be received. Beater shaft 42 has driving projections 56 engaging longitudinal slots 58 in the beater drive shaft 48 to insure rotation of the beater 42 with the drive shaft. In order to hold the beater shaft 42 in position, the lower end of beater drive shaft 48 is provided with a retaining member 60 having an inturned lower flange 59 below the projections 56 of beater 42. Retaining member 60 may be held in position on the beater drive shaft 48 by a spring ring 62 or other desired means. The inturned flange 59 at the lower end of retaining member 60 is provided with notches 64 through which the projections 56 may pass during attachment and removal of the beater 42 from the unit in known manner. Thus slight relative rotation of the retaining member 60 on shaft 48 will bring the flange 59 into position below the projections 56 so that the beater 42 will be held in driving engagement with the beater drive shaft 48.

In order to supply power to the beater unit 38, a flexible power shaft 66 has been provided. This power shaft 66 is provided with a flexible sheath or protective cover 68. One end of the flexible power shaft 66 is connected within the beater unit 38, while the other end of the flexible power shaft is provided with means for removable attachment of the shaft in suitable driven relationship with the power take-off shaft 24 of the food mixer.

As shown particularly in Figs. 6 and 7, the beater unit 38 includes lower and upper body or casing sections 70 and 72, respectively. These sections are normally secured together by bolts 74 passing through suitable bosses 76 and 78 in the respective members. Thus by removal of bolts 74 it is possible to remove the cover or upper portion 72 of the beater unit and obtain access to the parts as indicated in Fig. 6.

The lower body portion 70 of the beater unit 38 is provided with supporting projections 80 and 82 on which the one end of the flexible power shaft may be mounted. Thus the protective sheath 68 of the flexible shaft passes through suitable openings in the casing portions 70 and 72 at one end of the handle portion 40 and extends substantially axially of the handle portion on top of the supports 80 and 82. A clamp 84 holds the shaft cover 68 against the support 82 and is retained in position by bolts 86. Similarly a clamp 88 and bolts 90 serve to hold the inner end of the sheath 68 firmly in position on the inner support 80.

According to the invention suitable driving connections are located within the beater unit 38 to connect the end of the flexible power shaft in operative relation with the beater drive shaft 48. The driving connections include means by which the operator can control manually the transmission of power from the flexible power shaft to the beater drive shaft.

As shown, the inner end of the flexible power shaft 66 engages and drives one end of a driven clutch member 94. Clutch member 94 may be keyed to the shaft end 92 or, as illustrated in this case, the shaft portion 92 may be of non-circular cross section, while the driving clutch member has an axial recess of similar cross section as shown at 95.

Driving clutch member 94 is longitudinally slidable in a bearing portion 96 supported within the beater unit 38. This clutch portion 94 has clutch teeth or equivalent driving means at its other end for engagement with corresponding teeth or surfaces 100 on a driven clutch member 102. Thus when the clutch member 94 is moved to the right in Figs. 6 and 7, the teeth 98 and 100 will engage each other and the clutch member 94 will accordingly drive the clutch member 102.

Clutch member 102 may be formed as part of a longitudinal shaft 103 which carries a driving worm 104. The other end 106 of shaft 103 is rotatably supported in a bearing portion 110 which includes a ball thrust bearing 108 between the end of shaft portion 106 and the body of the bearing 110. This bearing portion 110 in turn may be threaded within a section of the body portion of the beater unit as indicated at 112.

A collar 114 on shaft 103 limits movement of the shaft toward the driving clutch member 94, by engagement of the collar 114 against the end of bearing bushing 96.

Worm 104 is in driving engagement with a worm gear 116 fastened to the upper end 118 of the beater drive shaft 48. Thus rotation of the shaft 103 and worm 104 will be transmitted to the worm gear 116, beater drive shaft 48, and hence in turn to the beater 42.

In order to control the engagement and disengagement of the driving clutch member 94 and driven clutch member 102, a control slide 120 is mounted within the beater unit. This slide 120 is provided with a laterally projecting arm 122 engaged between a longitudinally fixed collar 124 and a spring retaining ring 126 on the driving clutch member 94. Arm 122 has an opening 123, through which clutch member 94 projects. Thus longitudinal movement of the slide 120 in a direction parallel to the axis of the flexible power shaft end 92 will cause engagement and disengagement of the clutch teeth 98 and 100 to make and break the operative driving connection between the power shaft 66 and the beater drive shaft 48.

Control slide 120 is mounted for longitudinal reciprocation between the supporting portion 128 for bearing bushing 96 and the boss or projection 130 in the lower body member 70 of the beater unit. Slide 120 is provided at its lower corner adjacent the beater drive shaft with a lateral projection 134. Projection 134 engages the slot 132 of a manually operable control member 136. This member 136 is pivoted at 138 on an axis extending laterally of the beater unit and spaced from the axis of rotation of the clutch members 94 and 102. A spring 140 engages the manual control member 136 and tends to rotate it in a counter-clockwise direction as viewed in Fig. 7 so that a finger piece 142 on member 136 projects downwardly through a slot 144 in the casing member 70. Slot 144 and the finger piece 142 are located in an upwardly recessed section 146 of the lower wall of body member 70. Thus the finger portion 142 is located in position for convenient manipulation by the index finger of the operator's hand, when the operator is grasping the handle portion 40 of the beater unit.

Spring 140 urges the manual control member 136 and finger piece 142 in a direction so that clutch operating slide 120 is forced to the left in Figs. 6 and 7. This movement of the finger piece and operating slide 120 is limited by engagement of the end of driving clutch member 94 against the bearing portion 148 at the end of the flexible shaft sheath 68.

In operation, spring 140 normally maintains the parts in the position shown in Figs. 6 and 7 in which the driving and driven clutch members are disengaged from each other. When the operator desires to actuate the beater drive shaft 48 and beater 42, it is merely necessary to grasp the handle 40 of the beater unit and squeeze the finger portion 142 upwardly so that notch 132 moves pin 134 and slide 120 to the right, until the clutch teeth 98 and 100 are in driving engagement with each other. The beater drive shaft 48 will then be operatively connected to the flexible power shaft 66 as long as the finger piece 142 is held in its upper position. Should the operator accidentally drop the unit, the spring 140 will immediately restore the clutch parts to disengaged position so that rotation of the beater drive shaft 48 will terminate. Thus the possibility of damage to the beater 42 and beater blades 44 by inadvertent rotation when the device is out of the hands of the operator will be avoided.

The details of this clutch mechanism can be varied considerably within the scope of the present invention. For example, the clutch teeth 98 and 100 might be replaced by friction discs, and some other actuating linkage might be provided. In any event, the provision of a manually operable clutch or control means at a convenient location in the handle of the beater attachment is an important feature of the preferred form of the present invention.

At its other end, the flexible power shaft 66 is provided with means for removable attachment of the shaft in operative driving relationship with the power take-off shaft 24 of the mixer power unit. This attachment means is designated generally at 150 and includes a supporting bracket 152 adapted to fit against the top 30 of the mixer casing 14. Bracket 152 has a downwardly projecting annular hub 154 which loosely fits within the opening 28 around the power take-off shaft 24. This depending annular bracket portion 154 has an opening 164 which may fit relatively closely around the power take-off shaft 24 in order to serve as a means for adequately centering the bracket.

To hold the bracket 152 in its centered position, the bracket is provided with an opening 156 in alignment with the internally threaded opening 32 of the casing. A threaded bolt or attachment member 158 is rotatably mounted in opening 156 and is provided with finger pieces 160 for convenient manipulation. A retaining ring 162 on the shaft of bolt 158 is received within a recessed portion on the lower surface of bracket 152 and holds the retaining bolt 158 in operative relation with the bracket 152 when the device is removed from the power unit.

As indicated above, the supporting bracket 152 has an opening 164 in axial alignment with the power take-off shaft 24. A first power shaft or worm shaft 165 is rotatably mounted in opening 164 and is oriented in axial alignment with the power take-off shaft 24. This shaft 165 has a cross key 167 for engagement with the cross slot 26 of the power take-off shaft to provide a driving connection between the respective shafts.

Supporting bracket 152 is also provided with an upwardly projecting circular bearing portion 166 which is coaxial with the shaft 165 and power take-off 24. An annular recess 168 in this bearing portion 166 serves as a means for retaining in position a suitable gear housing designated generally at 170. The lower end 172 of this gear housing is rotatably supported on the circular bearing portion 166 and is provided with an inwardly projecting flange 174 fitting within the annular retaining recess 168 of the bearing portion to prevent relative axial displacement of the gear housing 170 with respect to bracket 152 and bearing portion 166, and at the same time permit relative rotation of the gear housing on the bracket.

As shown particularly in Figs. 3, 4, and 5, the gear housing 170 is made in two sections 176 and 178, respectively. These sections interfit with each other and are held together by suitable bolts or retaining screws 180. The plane of separation between the parts 176 and 178 substantially passes through the axis of the vertical power shaft 165.

Casing portion 176 includes a projecting knob 182 at its upper end which serves as a convenient handle for manipulation of the attachment means 150.

A removable cover or casing section 184 is also provided at one side of the casing portion 176 for convenience in assembly and disassembly of the gearing described below. This casing cover 184 is joined to the casing portion 176 by suitable bolts 186.

Within the gear casing or housing 170 spaced bearings 188 and 190 are provided for rotatable support of the first power shaft 165. Shaft 165 carries a worm 192 for driving engagement with a worm gear 194. Gear 194 in turn is keyed to a shaft 196 having driving engagement with the end 198 of flexible power shaft 66. A suitable bearing sleeve 200 supports the gear shaft or second power shaft 196 in position within the casing and this bearing portion 200 may be clamped in position by the removable cover portion 184. In this case the plane of separation between the cover 184 and the casing portion 176 passes substantially through the axis of the second power shaft 196.

The removable casing cover 184 and the casing portion 176 also have cooperating clamping portions 202 and 204, respectively, for clamping engagement with the end of the protective sheath 68 of the flexible power shaft.

From the foregoing description, the assembly and operation of the attachment means for the present beater unit will be apparent. The construction of gear casing 170 in two parts 176 and 178 facilitates assembly of the casing with flange 174 engaged in recess 168 of bracket 152. This interengagement of the flange 174 and annular recess 168 permits relative rotation of the gear casing and the end of flexible shaft 66 as shown by the heavy line and dotted line positions of Fig. 5. Thus the portable beater attachment of the present invention may be used at any desired relative horizontal position without the necessity of changing the angular position of the food mixer or power unit.

A construction has accordingly been provided which accomplishes the objects of the present invention and makes possible a wide range of mixing actions at nominal cost. Since minor variations and changes in the exact details of construction will be apparent to persons skilled in this field, it is intended that this invention shall cover all such changes and modifications as fall within the spirit and scope of the attached claims.

Now, therefore, I claim:

1. In a portable beater attachment for use in combination with a power unit having a power takeoff shaft, the attachment comprising a beater unit having a beater drive shaft rotatably mounted therein, a flexible shaft having one end operatively connected to the beater drive shaft, and means at the other end of the flexible shaft establishing driving connection with the power takeoff shaft, the improvement in said last mentioned means which comprises a housing, a worm shaft and worm rotatably mounted in the housing, means for removable attachment of the housing to the power unit in a predetermined fixed position with the worm shaft in driven engagement with the power takeoff shaft, the housing having a bearing portion coaxial with the worm shaft, a gear casing rotatably mounted on the bearing portion, and a worm gear rotatably mounted in the gear casing and engaging the worm in driven relation in a plurality of positions of the casing on the housing, the end of the flexible shaft being mounted on the gear casing and operatively connected to said worm gear.

2. In a portable beater attachment for use in combination with a power unit having a vertical power takeoff shaft, the attachment comprising a beater unit having a beater drive shaft rotatably mounted therein, a flexible shaft having one end operatively connected to the beater drive shaft, and means at the other end of the flexible shaft establishing driving connection with the power takeoff shaft, the improvement in said last mentioned means which comprises a housing, a vertical worm shaft and worm rotatably mounted in the housing, means for removable attachment of the housing to the power unit in a predetermined fixed position with the worm shaft in driven engagement with the power takeoff shaft, the housing having a bearing portion coaxial with the worm shaft, a gear casing rotatably mounted on the bearing portion, and a worm gear rotatably mounted on a horizontal axis in the gear casing and engaging the worm in driven relation in a plurality of positions of the casing on the housing, the end of the flexible shaft being mounted on the gear casing coaxially with the worm gear axis and operatively connected to said worm gear.

3. In a portable beater attachment having a flexible power shaft with means for removable attachment of the flexible shaft to a power unit having a power takeoff shaft, the improvement in the means for removable attachment which comprises two relatively rotatable members, fastening means for securing one member rigidly to the power unit, the flexible shaft being journalled in the other member, and driving connections mounted in said members operatively connecting the power takeoff shaft and flexible shaft in a plurality of positions of relative rotation of said two members.

4. In a portable beater attachment having a flexible power shaft with means for removable attachment of the flexible shaft to a power unit having a power takeoff shaft, the improvement in said means for removable attachment which comprises a bracket member, fastening means for securing the bracket member rigidly to the power unit, the bracket member having a circular bearing portion coaxial with the power takeoff shaft, a gear housing member rotatably mounted on said bearing portion, a first power shaft journalled in one of said members for coaxial driven engagement with the power takeoff shaft, a first gear on said power shaft, a second gear mounted in the gear housing member for rotation on an axis lying in a plane transversely intersecting the axis of the power takeoff and first power shaft, said second gear being in driven engagement with the first gear throughout rotation of the gear housing on the bracket, and means connecting the end of the flexible shaft to the rotatably mounted gear housing, with the shaft operatively connected to the second gear.

5. In combination, a household food mixer comprising a casing provided with a first beater drive shaft and a power takeoff shaft and a portable beater attachment comprising a beater unit having a second beater drive shaft thereon, a flexible power shaft connected between the power takeoff shaft and second beater drive shaft, and a manually operable clutch in the attachment controlling the transmission of power from the flexible shaft to the second beater drive shaft.

6. The combination according to claim 5 in which the first beater shaft is planetary, while the second beater shaft rotates in a stationary bearing in the attachment.

7. A household food mixer comprising a relatively stationary casing provided with a first beater drive shaft, a first beater driven by said first shaft, a power takeoff shaft in said casing, a portable beater unit having a second beater drive shaft and a second beater driven thereby, and a relatively long flexible power shaft operatively connecting the power takeoff shaft and second beater drive shaft.

8. In combination, a household food mixer comprising a main power casing provided with a first beater drive shaft and a power takeoff shaft, and a portable beater attachment comprising a relatively small beater casing of a size and shape readily grasped in one hand, a second beater drive shaft rotatably mounted in said beater casing, and a relatively long flexible power shaft having first means operatively connecting one end of the flexible shaft to the second beater drive shaft and second means operatively connecting the other end of the flexible shaft to the power takeoff shaft.

9. The combination according to claim 8 in which the second operative connecting means is readily removably mounted on the power casing and power takeoff shaft for easy engagement and disengagement of the portable attachment and associated flexible shaft from the main power casing.

WALTER VAN GUILDER.

REFERENCES CITED

The following references are of record in the file of this patent:

UNITED STATES PATENTS

| Number | Name | Date |
|---|---|---|
| 1,774,509 | Gould | Sept. 2, 1930 |
| 2,046,784 | Krause | July 7, 1936 |
| 2,278,187 | Strauss et al. | Mar. 31, 1942 |
| 2,483,727 | Frisbie | Oct. 4, 1949 |
| 2,502,239 | Walbach | Mar. 28, 1950 |

FOREIGN PATENTS

| Number | Country | Date |
|---|---|---|
| 539,315 | Germany | Nov. 24, 1931 |